United States Patent [19]

Takatsuki et al.

[11] Patent Number: 4,986,452
[45] Date of Patent: Jan. 22, 1991

[54] PUMPING DEVICE FOR LIQUID CONTAINERS

[75] Inventors: Toyohiko Takatsuki, Izumi; Masahiro Yoshida, Nara; Konomu Sugimoto, Sakai; Ryoichi Sakaguchi, Ikoma, all of Japan

[73] Assignee: Zojirushi Corporation, Osaka, Japan

[21] Appl. No.: 340,041

[22] Filed: Apr. 18, 1989

[30] Foreign Application Priority Data

Apr. 19, 1988 [JP] Japan .................................. 63-97687
Jan. 13, 1989 [JP] Japan .................................... 1-7258

[51] Int. Cl.⁵ .............................................. B65D 37/00
[52] U.S. Cl. .................................... 222/209; 222/318; 222/383; 222/401
[58] Field of Search ............... 222/130, 131, 209, 211, 222/318, 373, 383, 385, 400.5, 400.8, 401, 402, 212, 213, 214, 215

[56] References Cited

U.S. PATENT DOCUMENTS

| | | | |
|---|---|---|---|
| 2,680,477 | 6/1954 | Schira | 222/209 X |
| 3,905,520 | 9/1975 | Nishioka | 222/209 |
| 4,113,147 | 9/1978 | Frazier et al. | 222/131 |
| 4,174,053 | 11/1979 | Schimizu | 222/131 X |
| 4,238,054 | 12/1980 | Chen | 222/209 X |
| 4,274,562 | 6/1981 | Medeiros et al. | 222/131 X |
| 4,310,104 | 1/1982 | Takatsuki | 222/209 X |
| 4,344,548 | 8/1982 | Frazier | 222/209 |
| 4,512,246 | 4/1985 | Chappell et al. | 222/209 X |
| 4,705,195 | 11/1987 | Heck | 222/209 X |

FOREIGN PATENT DOCUMENTS 0075600 6/1980 Japan .................................. 222/401

*Primary Examiner*—H. Grant Skaggs
*Assistant Examiner*—Boris Milet
*Attorney, Agent, or Firm*—Jones, Tullar & Cooper

[57] ABSTRACT

A pumping device for a liquid container comprises a bellows body with upper and lower plates. The upper plate has a suction port adapted to be communicated with the atmosphere, , and the lower plate has an exhaust port adapted to be communicated with an interior of the liquid container a suction valve is adapted to open and close the suction port; and a bellows return spring is adapted to expand the bellows body. A stop valve assembly is arranged in the bellows body and forms a bypath for communicating the interior of the bellows body with the interior of the container. The stop valve assembly comprises a flap valve adapted to allow the air only to flow from the bellows pump to the container through to air port during operation of the bellows body, and a valve structure for closing the bypath, the valve structure being operated under the conditions synchronized with contraction and expansion motion of the bellows body in such a manner that is closes the bypath just after starting the contraction of the bellows body but opens the same just before finishing the expansion of the bellows body. The stop valve assembly may be replaced with one comprising a case having a main path and a bypath for communicating the interior of the bellows body with the interior of the container, a stop valve arranged in the main path so that it allows the air only to flow from the bellows body to the container, a valve structure arranged in the bypath, and a device for operating the valve structure.

8 Claims, 6 Drawing Sheets

PUMPING DEVICE FOR LIQUID CONTAINERS

FIELD OF THE INVENTION

The present invention relates to a pumping device for liquid containers such as a vacuum bottle, a pot with an electric heater, and the like.

BACKGROUND OF THE INVENTION

So far, as a pumping device for liquid containers, there have widely been used various kinds of bellows pumps which serve to pump air into an interior of a container to increase its internal pressure, thereby pouring liquid such as hot or cold water in the container therefrom through a pumping tube. For example, as shown in FIG. 7, a bellows pump 100 is applied to a vacuum bottle 1 comprising a vacuum insulated, double walled inner bottle 7a housed in an outer container 7 with a lid body 2.

Such a bellows pump 100 generally comprises a bellows body 101 with upper and lower plates 102, 104 having a suction port 103 or an exhaust port 105, a suction valve 106 adapted to open and close the suction port 103, and a bellows return spring 107 arranged in the bellows body 101 to keep it expanded.

In use, the bellows pump 100 is operated by manually pushing down the push cover 5 to feed air into an interior of the inner bottle 7a. By manually pushing down the cover 5, the suction valve 106 is firstly closed, and the bellows body 101 is deflated so that the air in the bellows pump 100 is fed into the interior of the inner bottle 7a through the exhaust port 105 to increase the internal pressure of the inner bottle 7a. Thus, the liquid, such as hot water or cold water for example, in the inner bottle 7a is poured therefrom through a pumping tube 108.

As a rule, the bellows pump 100 involves a chamber of variable volume, having the maximum volume sufficient to fill a cup with the liquid in the inner bottle 7a. When it is required to pour a large amount of the contained liquid, the cover 5 has to be pushed down repeatedly, resulting in a troublesome operation. For example, when the cover 5, after being pushed down to its lowest position, is released from the external pressure, the suction valve 106 is forced upwardly to open the suction port 103. Thus, the increased pressure in the inner bottle is reduced to the atmospheric pressure every return stroke of the bellows pump 100, resulting in lowering of the pumping efficiency of the bellows pump. This becomes a large problem when pouring a large amount of a cold liquid. If the air is fed to the inner bottle containing cold water, the internal pressure of the inner bottle is not so increased since the air in the bottle is contracted by the cold heat of the liquid.

Further, the internal pressure of the inner bottle is increased every contraction of the bellows pump, so that the liquid, for example, hot water in the inner bottle is intermittently poured into hot water previously poured into the cup, resulting in scattering of the hot water.

SUMMARY OF THE INVENTION

It is therefore an object of the present invention to provide a pumping device for a liquid container that makes it possible to continuously pour a large amount of liquid in the container into another vessel such as a tea pot or the like.

Another object of the present invention is to provide a pumping device for a liquid container, which can be changed from a continuous pouring operation to an intermittent pouring operation, or vise versa.

These and other objects of the present invention are solved by providing a pumping device for a liquid container, comprising a bellows body with upper and lower plates each having a suction port adapted to communicate with the atmosphere or an exhaust port adapted to communicate with an interior of said liquid container through a passage; a suction valve attached to said upper plate and adapted to open and close said suction port; a bellows return spring adapted to expand said bellows body; and a stop valve assembly arranged in said passage and forming a bypath through which the interior of said bellows body is communicated with the interior of said container, said stop valve assembly comprising a stop valve and a valve means for closing said bypath, said stop valve being adapted to allow the air only to flow from the bellows body to said container, said valve means being operated under the conditions synchronized with a contraction and expansion motion of said bellows body in such a manner that it closes said bypath just after starting the contraction of said bellows body but opens the same just before finishing the expansion of said bellows body.

According to the present invention, there is also provided a pumping device for a liquid container, comprising a bellows body with upper and lower plates each having a suction port adapted to communicate with the atmosphere or an exhaust port adapted to communicate with an interior of said liquid container through a passage; a suction valve attached to said upper plate and adapted to open and close said suction port; a bellows return spring adapted to expand said bellows body; and a stop valve assembly arranged in said passage and comprising a case having a main path and a bypath for communicating the interior of said bellows body with the interior of said container, a stop valve arranged in said main path so that it allows the air only to flow from the bellows body to said container, a valve means arranged in said bypath, and a means for operating said valve means.

DETAILED DESCRIPTION OF THE PREFERRED EMBODIMENT

Figure 1:
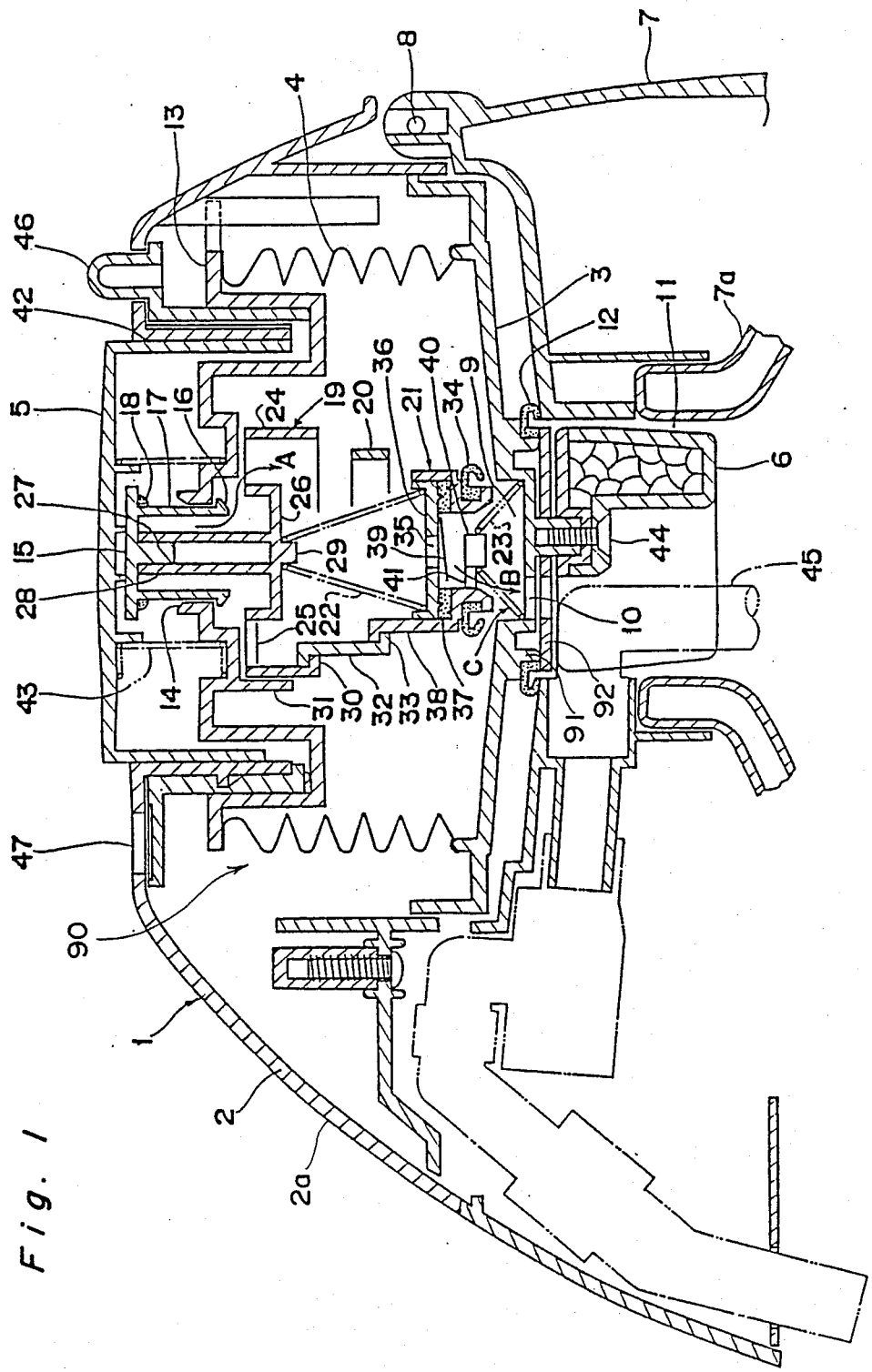
FIG. 1 is a section view of an upper part of a vacuum bottle with a pumping device according to the present invention.
Figure 2:
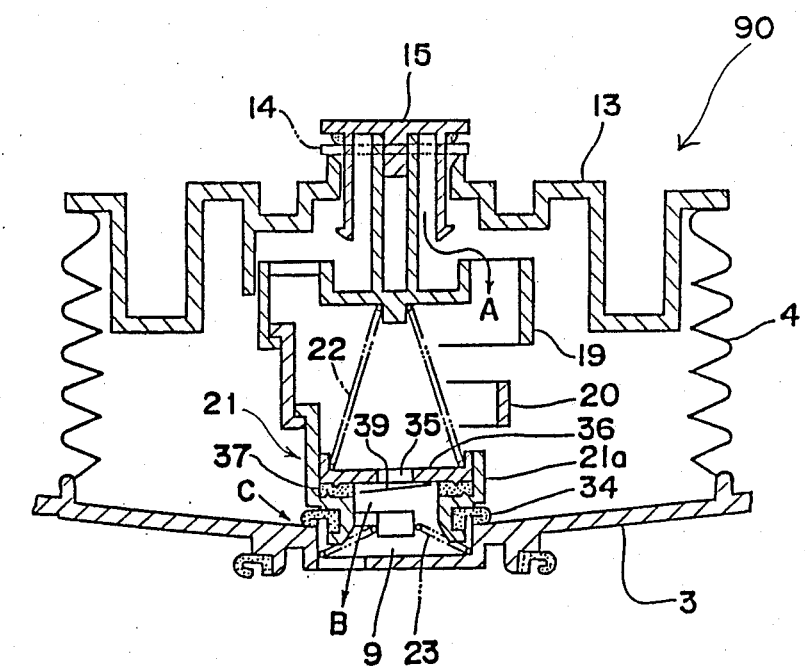
FIG. 2 is a section view of a pumping device of FIG. 1.
Figure 7:
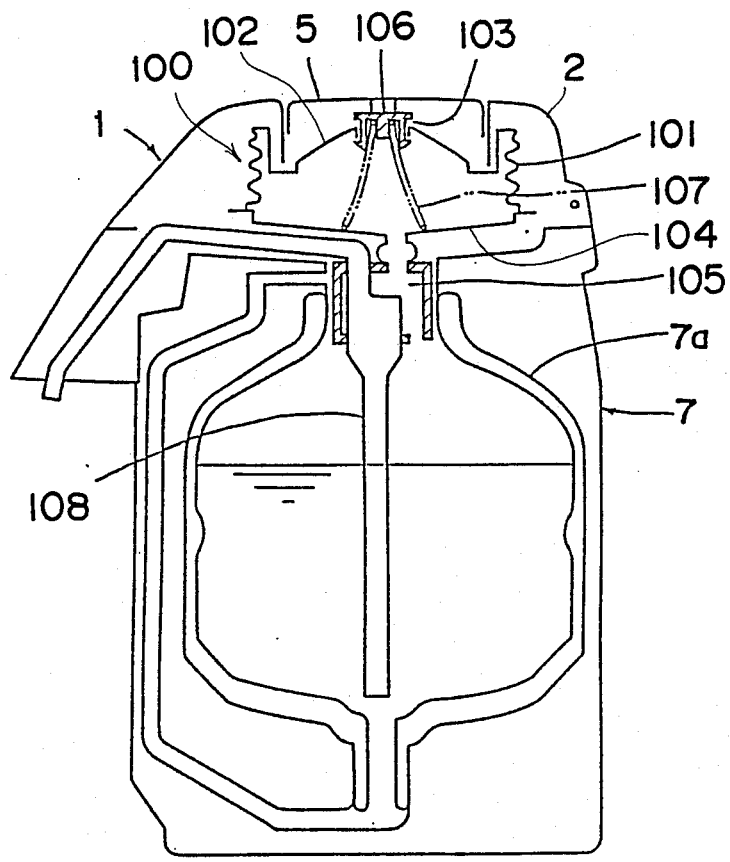
FIG. 7 is a section view of a vacuum bottle with a bellows pump of the prior art.

Referring now to FIGS. 1 and 2, there is shown a vacuum bottle with a pumping device embodying the present invention. The vacuum bottle 1 comprises an outer container 7, a lid 2 hinged to the outer container 7 by a pin 8, and a vacuum insulated, double walled inner bottle 7a arranged in the outer container 7. The outer container 7 and inner bottle 7a have the same construction as those of the vacuum bottle of the prior art shown in FIG. 7. Thus, the details of these members will need no explanation.

The lid 2 comprises a lid body 2a and a bottom member 3 mounted in the lower end of the lid body 2a to form a space for housing the pumping device. The lid 2 includes a cylindrical push cover 5 movably mounted in a recess of the lid body 2a, and a heat-insulating plug 6 fixed to the bottom member 3. The bottom member 3 is provided at its central area with a recess 9, and at the lower side of the central area with an annular rib 91, on which a seal ring 12 is mounted to close an opening 11 of the inner bottle 7a when the lid 2 is closed.

The pumping device comprises a bellows pump 90 with a stop valve assembly arranged therein. The bellows pump 90 comprises a bellows body 4, an upper plate 13 having a suction port 14, a return spring holder 19, and a bellows return spring 22. The bellows body 4 is sealingly attached at its upper opening to the upper plate 13, and fixed at its lower opening to the bottom member 3 of the lid 2 to form a chamber with a variable volume. Thus, the bottom member 3 of the lid 2 serves as a lower plate of the bellows pump 90. The bottom member 3 is provided at its recessed portion with an exhaust port 10, through which the interior of the bellows body 4 is communicated with an interior of the inner bottle 7a. The bellows body 4 is so designed that it has the maximum volume sufficient to fill a cup with the liquid in the inner bottle 7a poured by one compression stroke of the bellows body 4.

The upper plate 13 is provided at its central portion with the suction port 14 adapted to be opened and closed by a suction valve 15. The suction valve 15 has plural hooks 17 extending downwardly and movably arranged in the suction port 14 of the upper plate 13. The suction valve 15 is attached to the upper plate 13 by inserting its hooks 17 into the suction port 14 so that the hooks 17 are caught at its lower end 16 by the other end of the suction port 14. A packing 18 is attached to the suction valve 15 in order to sealingly close the suction port 14 when the push cover 5 is forced downwardly by an external force.

The return spring holder 19 is composed of a hollow cylindrical portion 24 and a spring supporting portion 26 arranged coaxially with the cylindrical portion 24. The supporting portion 26 is connected to the cylindrical portion 24 by three stays 25 extending radially between them at certain intervals. The supporting portion 26 is provided at its central portion with an upwardly extending cylindrical projection 28, to which the suction valve 15 is press-fitted. At the lower side of the supporting portion 26, there is provided a projection 29 extending downwardly from the central portion of the supporting portion 26. The cylindrical portion 24 is provided at its lower end with an inner flange 30. The outer surface of the spring holder 19 is slidably mounted in a guide member 31 of the upper plate 13 so as to be moved in the direction parallel to its longitudinal vertical axis along with the suction valve 15.

The guide member 20 is of a short cylindrical member, and is provided at its upper end with three hooks 32 adapted to be hooked in the inner flange 30 of the spring holder 19. The guide member 20 is provided at its lower end with an inner flange 33.

The stop valve assembly 21 comprises a short cylindrical body 21a with three upwardly extending hooks 38, a valve seat member 36, a valve flap 39 hinged to the seat member 36. A seal packing 37 is arranged between the cylindrical body 21a and valve seat member 36. The valve assembly 21 is guided by the guide member 20. The cylindrical body 21a is provided at its lower side with a seal packing 34 adapted to close a bypath C formed between the valve assembly 21 and the bottom plate 3.

The bellows return spring 22 is arranged between the supporting portion 26 of the spring holder 19 and the valve seat member 36 to force the valve 15 upwardly. The valve seat member 36 is provided with an air port 35. The valve assembly 21 is provided with a support 40 connected to the cylindrical body 21a by three stays 41 extending radially at a certain angle to each other. A conical valve return spring 23 is arranged between the support 40 and the bottom of the recess 9 to force the valve assembly 21 upwardly to form the bypath C between the stop valve assembly 21 and the bottom plate 3. The valve return spring 23 has a spring constant smaller than that of the bellows return spring 22.

The push cover 5 constituting a part of the lid body is slidably arranged in a guide cylinder 42 formed as an integral part of the lid body 2, and is forced upwardly by a coil spring 43 arranged between the push cover 5 and the upper plate 13.

At the lower end of the annular rib 91, there is arranged a bottom cover 92 spaced from the recessed portion of the bottom plates 3 to form a thermal insulating air layer between them. The bottom cover 92 is held by the plug 6 fixed to the bottom plate 3 by a screw 44. The plug 6 is provided with a recess having a semicircular cross section so as to house the pumping tube 45.

A locking knob 46 is provided in the lid body 2 so as to prevent the push button 5 from reciprocating motion when not in use. The lid body 2 is provided with a hole 47 for indicating the position of the locking knob 46.

When no external force is applied to the push cover 5 of the vacuum bottle, the bellows is expanded to its maximum volume by the action of bellows return spring 22 and valve return spring 23, and the suction valve 15 and valve assembly 21 are forced upwardly by the springs 22 and 23 to open the suction port 14 and exhaust port 10 of the bellows. Thus, the interior of the bellows body 4 is communicated with the atmosphere through the suction port 14, and with the interior of the inner bottle 7a through the exhaust port 10. This exhaust port 10 is communicated with the interior of the bellows body 4 through the valve port 35 and the bypath C formed between the packing 34 and bottom plate 3.

In use, the above constructed pumping device is operated in the following manner.

When continuously pouring a large amount of liquid, it is sufficient to force down the push cover 5 repeatedly. When the push cover 5 is forced down, the valve return spring 23 is firstly compressed by the force applied through the suction valve 15, spring holder 19, bellows return spring 22 and stop valve assembly 21 since the spring constant of the valve return spring 23 is smaller than that of the bellows return spring 22. After the valve packing 34 is brought into contact with the bottom plate 3 to close the bypath C as shown in FIG. 2, the spring 43 is compressed to close the suction port 14 so that the suction valve 15 is brought into contact with the tip of the suction port 14 of the upper plate 13 to close the suction port 14 as illustrated by the two dot line in FIG. 2.

The bellows return spring 22 is then compressed by further pushing down the push cover 5 until the cover 5 reaches its lowest position, so that the bellows body 4 is deflated to feed the air in the bellows body 4 into the interior of the inner bottle 7a through the air port 35 of the stop valve assembly 21. For this reason, the internal pressure in the inner bottle 7a is increased, whereby the liquid, such as hot water or cold water for example, in the container is poured therefrom through the pumping tube 45.

After the push cover 5 has reached its lowest position, the external force applied on the push cover 5 is weakened, so that the suction valve 15 is firstly pushed up by the action of the bellows return spring 22 along with the return spring holder 19. Thus, the suction port 14 is opened to allow external air to flow into the bellows body 4, while the stop valve assembly 21 is maintained in its lowest position to close the bypath. At the same time, the valve flap 39 is closed by the difference in pressure between the internal pressure of the bellows body 4 and the internal pressure of the inner bottle 7a which is higher than that of the former. Thus, the interior of the inner bottle 7a maintains its increased pressure. With increase of the volume of the bellows body 4, the external air is sucked into the interior of the bellows body 4 along the path indicated by the arrow A in FIG. 1.

Before the expansion of the bellows body is finished, the push cover 5 is stopped to keep the bypath closed, and then pushed down to pump air into the inner bottle 7a. Thus, the internal pressure of the inner bottle 7a is kept at a pressure enough to pour the liquid, and further increased by the next pushing operation of the push cover 5. Accordingly, if the push cover 5 is forced down before the internal pressure of the inner bottle 7a is lowered to atmospheric pressure, the liquid in the inner bottle 7a is continuously poured therefrom.

After pouring of the liquid is finished, the external force is removed completely from the push cover 5, so that the bellows body 4 is expanded to its maximum volume shown in FIG. 1 by the action of the springs 22 and 23, and the stop valve assembly 21 is lifted up by the action of the valve return spring 23. When the packing 34 is left from the bottom plate 3, the bypath C is opened to allow the interior of the inner bottle 7a to communicate with the atmosphere through the bellows body 4, so that the compressed air in the inner bottle 7a flows into the bellows body 4 through the passage B and bypath C until the internal pressure of the bottle 7a becomes equal to the atmospheric pressure.

When pouring a cup of hot water, the pumping device is operated in the same manner as that for the bellows pump of the prior art. That is, the push cover 5 is forced down and held in its lowest position until the cup is filled with hot water, and then released from the external force. In this case, the bypath has no influence on the air flow from the bellows pump to the inner bottle since the bypath is closed just before starting the contraction of the bellows body and opened just before finishing the expansion of the bellows body.

If the external force applied to the push cover 5 moves removed completely, the packing 34 is away from the upper surface of the bottom plate 3 to open the bypath. Thus, the air in inner bottle 7a flows to the atmosphere through the bellows body 4 so that the internal pressure of the inner bottle is balanced with the atmospheric pressure.

Figure 3:
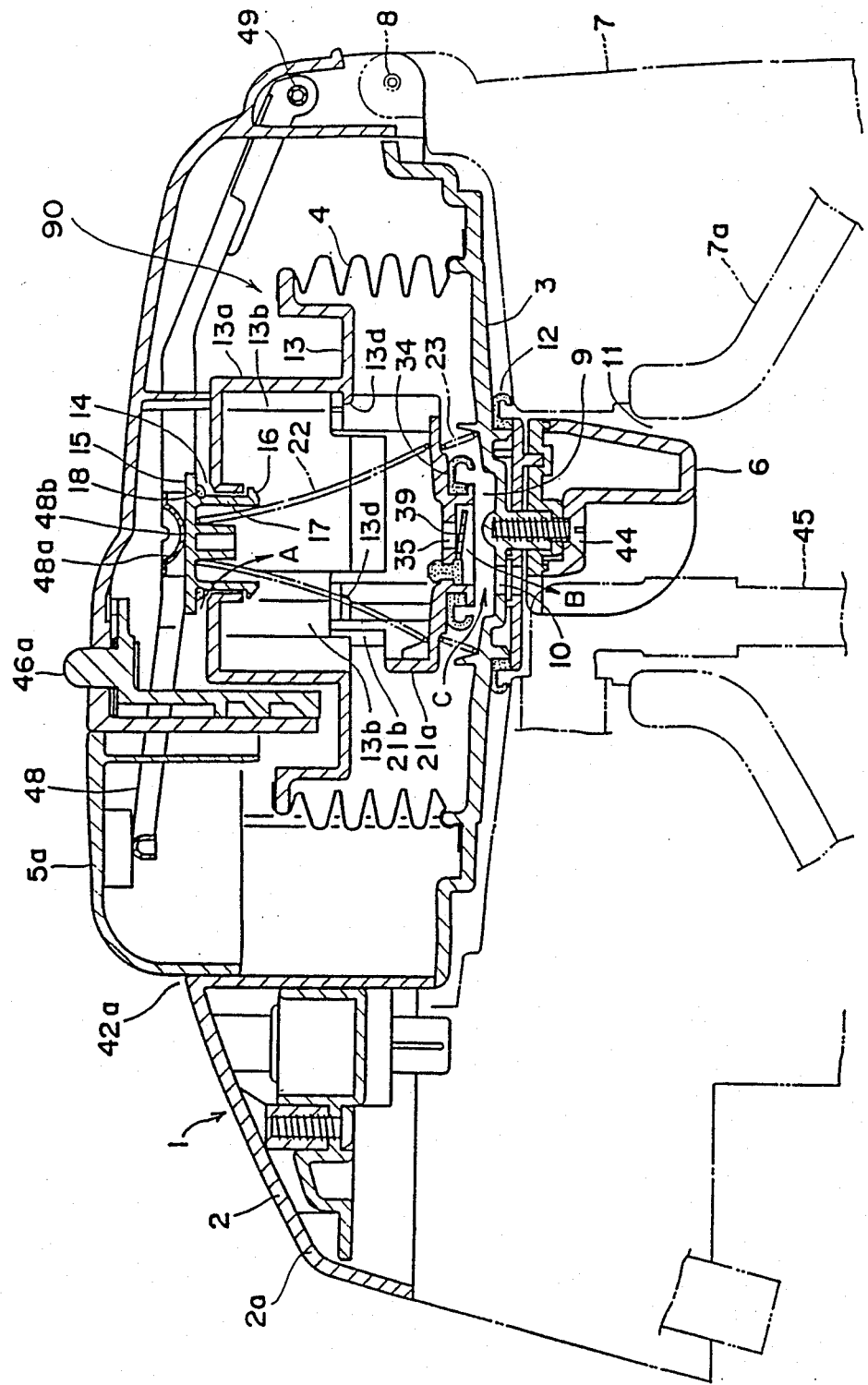
FIG. 3 is a section view of a part of a pumping device applied to a vacuum bottle, showing another embodiment of the present invention.

Turning now to FIG. 3, there is shown another embodiment of the pumping device according to the present invention. The pumping device 90 has the same construction as that of the embodiment of FIG. 1, except that the stop valve assembly 21 is guided by a cylindrical cavity provided in the upper plate 13 of the bellows pump 90, that the suction valve 15 is forced down by means of a lever 48, and a lock member 46a is provided near the central portion of the lid 2. Thus, like parts are numbered with like reference numbers on the figure.

In this embodiment, the upper plate 13 of the bellows body 4 is provided with an upwardly extending cylindrical portion 13a and three guide grooves 13b extending in the direction parallel to the central axis of the cylindrical portion 13a. The stop valve assembly includes a disk-like member 21a with a through hole 35, a valve flap 39, an annular packing 34 mounted on the bottom of the member 21a, a valve return spring 23. The disk-like member 21a has three gate-like guide members 21b, each of which is slidably put in the guide groove 13b of the upper plate 13 and prevented from slipping out of position by a projection 13d provided at the lower end of the groove 13b. Thus, there is no need to provide the spring holder 19 and guide member 20 used in the embodiment of FIG. 1. The stop valve assembly can be attached to the upper plate 13 easily by inserting the guide members 21b into the grooves 13b.

The lid body 2 is provided at its front side with a guide hole 42a, into which a push knob 5a is slidably arranged. The lever 48 has a U-shaped cross section, and is provided with a cross bar 48a having a spherical projection 48a provided at its central portion. The lever 48 is pivotally mounted on the lid body 2 at its one end by a pin 49 above the pin 8 so that its projection 48a comes into contact with the suction valve 15. The lever 48 works with a swing motion by pushing and releasing operation of the push cover 5a. Such a construction makes it possible to minimize a force required for operating the push cover 5a because of the leverage of the lever 48.

The lock member 46a is slidably mounted on the inner wall of the guide hole 42a and adapted to be moved by a hand from a locking position, where it prevents the push cover 5a from its downward movement, to an unlocking position where it allows the push cover 5a to move downwardly.

The above pumping device can be operated in the same manner as that of FIG. 1. Thus, no detailed explanation on its operation will be needed.

Figure 5:
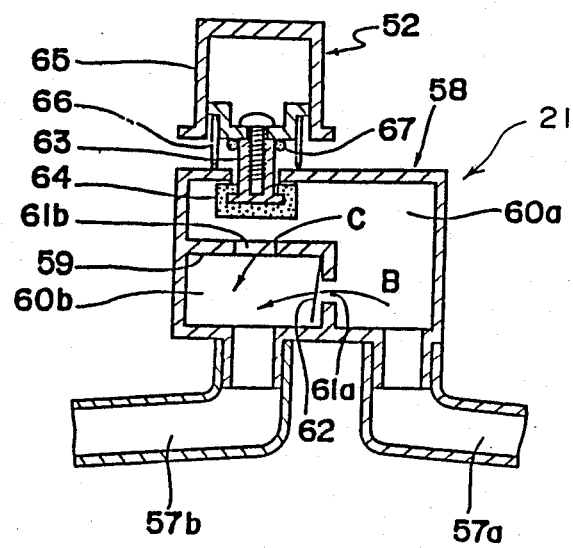
FIG. 5 is a partially enlarged section view of the pumping device of FIG. 4.
Figure 4:
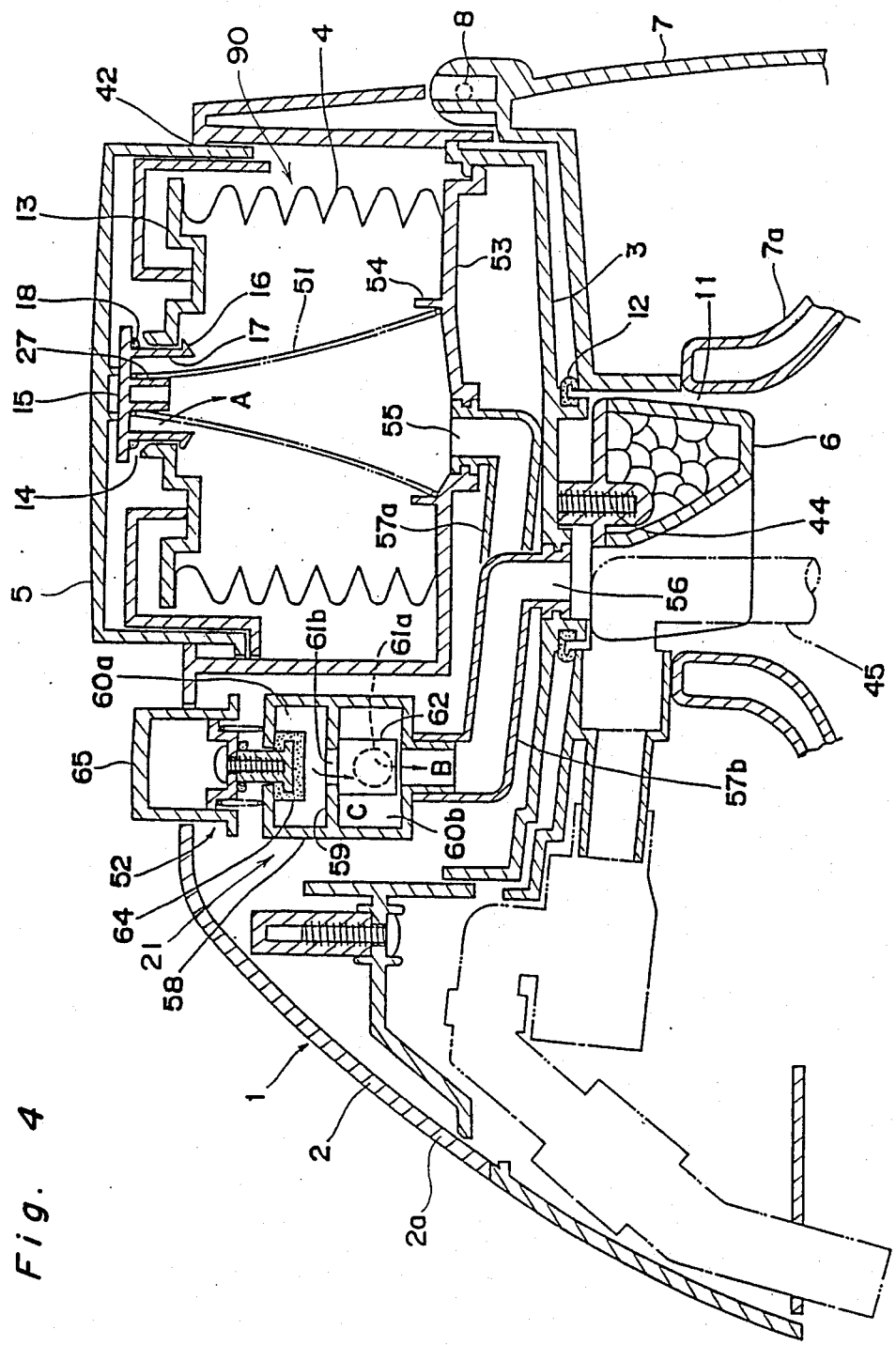
FIG. 4 is a section view of a pumping device applied to a vacuum bottle, showing another embodiment of the present invention.

Referring to FIGS. 4 and 5, there is shown another embodiment of the pumping device for a liquid container according to the present invention. In this embodiment, the stop valve assembly 52 is arranged out of the bellows pump 90 but in the space formed between the lid body 2a and the lid bottom member 3. The bellows pump 90 comprises a bellows body 4, upper and lower plates 13, 53 each having a suction port 14 or exhaust port 55, a suction valve 15 arranged in the suction port 14, and a bellows return spring 51. The bellows return spring 51 is fitted at its upper end to an engaging projection 27 of the suction valve 15, and at its lower end to an annular rib 54 provided on the lower plate 53.

The stop valve assembly 21 comprises a valve case 58, a valve flap 62, and a valve means 52. The case 58 is divided into first and second chambers 60a and 60b by a partition 59. The second chamber 60b has an L-shaped cross section and forms a bypath C. The exhaust port 55 of the bellows pump 90 is connected to the first chamber 60a of the stop valve assembly 21 by a connecting tube 57a, and the second chamber 60b of the stop valve assembly 21 is connected to an air feed port 56 of the bottom member 3 by a connecting tube 57b.

As best shown in FIG. 5, the partition 59 is provided with first and second openings 61a and 61b, through which the first chamber 60a is communicated with the second chamber 60b. The flap 62 is hinged to the partition 59 and works with a swing motion to close the first opening 61a. The valve means 52 comprises a stem 63 passing through the top wall of the case 58, a seal packing 64 mounted on a disk-shaped lower end of the stem 63, a push knob 65 attached to an upper end of the stem 63, and a valve return spring 66. The stem 63 is provided with a seal ring 67 to seal the stem and the through hole of the case. The push knob 65 extends upwardly and is arranged in an opening provided in the top wall of the lid body 2a.

In use, a large amount of liquid can be poured continuously by firstly forcing down the push knob 65 to close the second opening 61b, and then performing pushing and releasing operations of the push cover 5 many times in short intervals. When the push knob 65 is forced down until the valve packing 64 is pressed against the partition 59, the bypath C is closed. Then, the push cover 5 is forced down, so that the bellows return spring 51 is compressed so that the suction valve 15 is brought into contact with the tip of the suction port 14 to close the suction port 14.

By further pushing down the push cover 5, the air in the bellows pump 90 is fed into the interior of the inner bottle 7a through the exhaust port 55, connecting tube 57a, first opening 61a, and connecting tube 57b as illustrated by an arrow B in FIGS. 4 and 5. Thus, the internal pressure of the inner bottle 7a is increased, whereby the liquid, such as hot water or cold water for example, in the container is poured therefrom through the pumping tube 45.

When the external force is decreased or removed from the push cover 5 under the condition that the bypath C is kept closed by forcing down the push knob 64, the suction valve 15 is push up by the action of the bellows return spring 51, and the suction port 14 is opened to allow the external air to flow into the bellows body 4. Since the flap 62 is forced to the partition 59 by the difference in pressure between the bellows pump 90 and the inner bottle 7a, the interior of the inner bottle 7a is kept at a certain increased pressure. With increase of the volume of the bellows pump 90, the external air is sucked into the interior of the bellows body 4 through the suction port 14 as indicated by the arrow A.

After the push cover 5 reaches to its uppermost position, the cover 5 is forced down again to feed the air in the bellows pump 90 into the inner bottle 7a. Since the internal pressure of the inner bottle 7a is kept at a certain increased pressure, the liquid in the inner bottle is poured at once therefrom through the pumping tube 45. Accordingly, if the push cover 5 is forced down before the internal pressure of the inner bottle 7a is lowered to a pressure at which pouring of the liquid is stopped, the liquid in the inner bottle 7a is continuously poured therefrom.

After a sufficient amount of the liquid is poured, the push knob 65 is released from the external pressure, so that the valve packing 64 is push up by the action of valve return spring 66. Thus, the bypath C is opened and the compressed air in the inner bottle 7a flows to the atmosphere through the bellows pump 90 and suction port 14 until the internal pressure of the bottle 7a becomes equal to the atmospheric pressure.

When pouring a cup of liquid, the push cover 5 is forced down, without pushing down the push knob 65. In this case, the second opening 61b is always kept open, the air in the bellows pump 90 flows to the inner bottle 7a through the second opening 61b and the first opening 61a. The provision of the bypath C makes it possible to prevent the inner bottle 7a from increasing in internal pressure since the second opening 61b is kept open even when the push cover is released from the external force.

Figure 6:
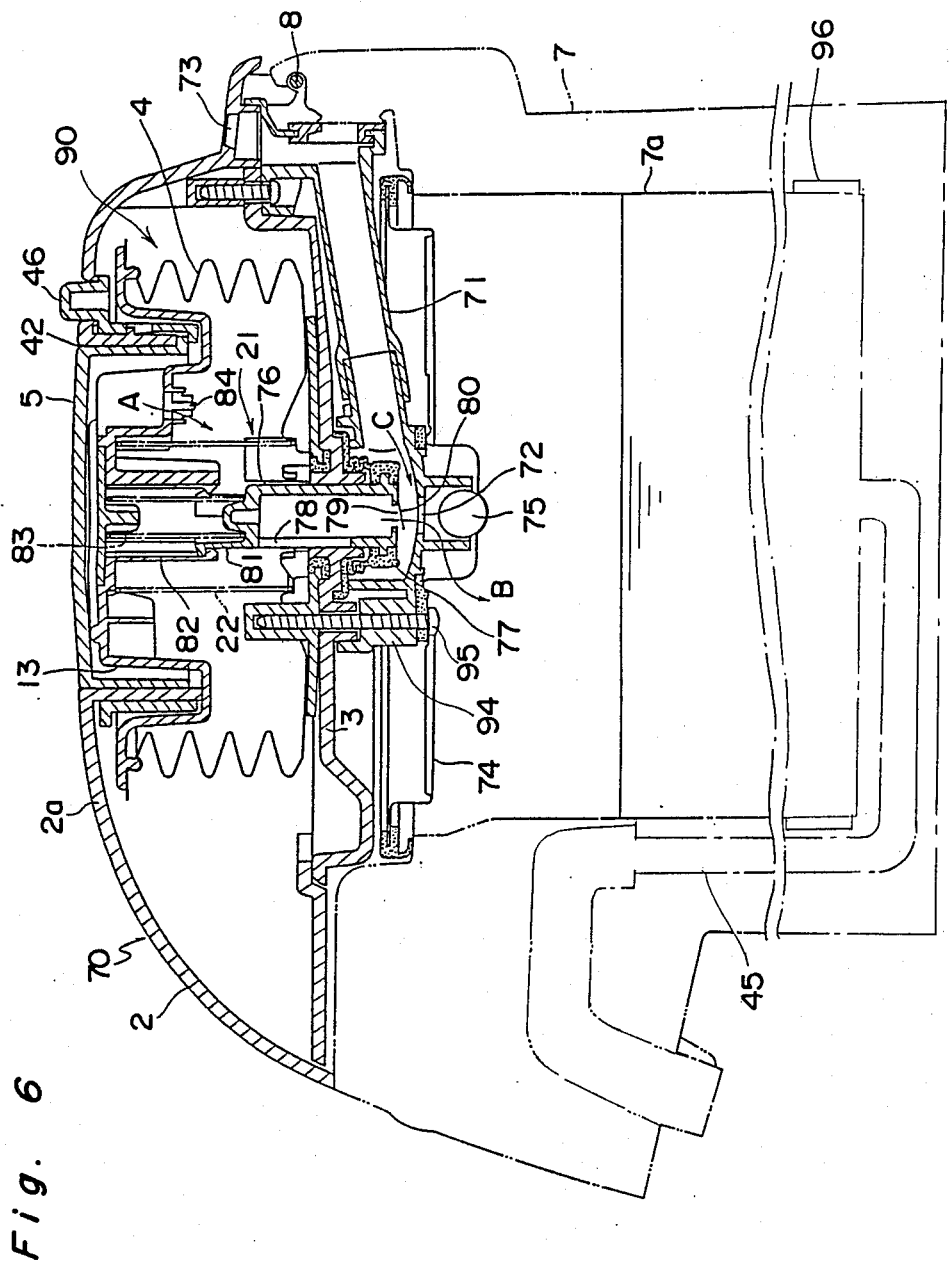
FIG. 6 is a section view of a pumping device applied to a pot with an electric heater.

In the foregoing embodiments, the pumping device of the present invention has been applied to vacuum bottles. However, the pumping device of the present invention may be applied to a pot 70 with an electric heater, for example, as shown in FIG. 6.

In this embodiment, the inner vessel 7a is made of a metal such as stainless steel, and provided at its lower portion with an electric heater 96. The pumping tube 45 is arranged in a space between the inner vessel 7a and outer container 7. The bottom plate 3 of the lid 2 is provided at its central portion with a cylindrical member 94 and a steam pipe 71. The pipe 71 is connected at its one end to the cylindrical member 94, and at its other end to a steam port 73 provided in the lid body 2a. An inner lid member 74 and cylindrical member 94 is fixed to the bottom member 3 by screws 95. The cylindrical member 94 is provided with an opening 72, through which the interior of the inner vessel 7a is communicated with the interior of the bellows pump 90 and steam pipe 71. At the lower end of the cylindrical member 94 there is provided a housing for a ball 75 adapted to close the opening 72 when the pot falls down. A stop valve 84 is used as a suction valve 84 for the bellow pump.

The stop valve assembly 21 comprises a valve cylinder 76 having a side port 78 and exhaust port 79, a flap 80 hinged to the bottom of the valve cylinder 76 to close the exhaust port 79, a valve packing 77 attached to the lower part of the valve cylinder 76, and a valve return spring 83 arranged between the top plate 13 and top of the cylindrical member 76.

The valve cylinder 76 is slidably arranged in the port of the bottom plate 3 and just above the opening 72 so that the packing 77 comes into contact with the bottom wall of the cylindrical member 94 surrounding the opening 72 to close a bypath C formed between the packing 77 and cylindrical member 94 when the valve cylinder 76 is pushed down by the push cover 5. The valve cylinder 76 is provided at its top with hooks 81, which are put in grooves of guide members 82 extending downwardly from the upper plate 13 of the bellows pump 90. The hooks 81 are prevented from slipping out of position by stoppers provided at the lower ends of the guide members 82.

Thus, the interior of the inner vessel 7a is communicated with the interior of the bellows pump 90 through the opening of exhaust port 79 of the stop valve, and with the steam pipe 71 through the bypath C formed between the packing 77 and the cylindrical member 94.

By forcing down the push cover 5, the valve cylinder 76 is forced downwardly by the action of valve return spring 83 to close the bypath C, and the compression of the bellows body 4 takes place after the valve packing 77 has come into contact with the bottom wall of the cylindrical member 94. If the push cover 5 is released from the external force, the bellows body 4 is expanded by the bellows spring 22, and the valve cylinder 76 is pulled up by the guide members 82 just before the bellows body 4 is expanded completely since its hooks 81 are engaged with the ribs of the guide members 82.

Accordingly, if the pushing and releasing operation of the push cover 5 is repeatedly performed within the range where the hooks 81 are never engaged with the ribs of guide members 82, the liquid in the inner vessel 7a is poured continuously therefrom.

What is claimed is:

1. A pumping device for a liquid container, comprising:
   a bellows body with upper and lower plates, said upper plate having a suction port adapted to be communicated with atmosphere, said lower plate having an exhaust port adapted to be communicated with an interior of said liquid container;
   a suction valve attached to said upper plate and adapted to open and close said suction port;
   a bellows return spring adapted to expand said bellows body; and
   a stop valve assembly arranged in said bellows body and forming a bypath through which the interior of said bellow body is communicated with the interior of said container, said stop valve assembly having an air port and comprising a flap valve adapted to allow substantially all of the air in said bellows body to flow from the bellows body to said container through said air port during operation of said bellows body, and valve means for closing said bypath, said valve means being operated under the conditions synchronized with contraction and expansion motion of said bellows body in such a manner that it closes said bypath just after starting the contraction of said bellows body but opens the same just before finishing the expansion of said bellows body.

2. The pumping device according to claim 1, wherein said stop valve assembly comprises a cylindrical body arranged in the bellows body so as to form said bypath between its lower end and said lower plate, a valve seat member mounted on said cylindrical body to form said air port, a seal packing attached to the lower part of said cylindrical body to constitute said valve means for closing said bypath, a valve return spring arranged between said cylindrical member and the lower plate of said bellows body to force the stop valve assembly upwardly, said valve return spring having a spring constant smaller than that of the bellows return spring so that the seal packing closes said bypath just after starting the contraction of said bellows body but opens the same just before finishing the expansion of said bellows body.

3. The pumping device claimed in claim 2, wherein said suction valve is provided with a cylindrical return spring holder, said cylindrical body of the stop valve assembly being guided by a guide member slidably arranged in said holder.

4. The pumping device claimed in claim 1, wherein said upper plate of the bellows body is provided with a cylindrical cavity having guide grooves, and wherein said stop valve assembly being movably connected to said upper plate by means of guide members slidably arranged in said guide grooves of the cylindrical cavity.

5. A pumping device for a liquid container comprising;
   a bellows body with upper and lower plates, said upper plate having a suction port adapted to be communicated with atmosphere, said lower plate having an exhaust port communicated with the interior of said liquid container through a passage formed between said exhaust port of the bellows body and said container;
   a suction valve attached to said upper plate to open and close said suction port;
   a bellows return spring adapted to expand said bellows body; and
   a stop valve assembly arranged in said passage and forming a bypath for communicating the interior of said bellows body and the interior of said container, said stop valve assembly comprising a main path for communicating the interior of said bellows body and the interior of said container, a flap valve adapted to close and open said main path to allow the air only to flow from the bellows pump to said container during operation of said bellows body, and valve means for closing said bypath during operation of said bellows body.

6. The pumping device claimed in claim 5, wherein said stop valve assembly comprises a valve case having a chamber divided into first and second chambers by a partition, said first chamber being connected to said exhaust port of the bellows body through said passage, said second chamber being connected to said container through said passage, said partition being provided with first and second openings for communicating said first chamber with said second chamber to form said main path and bypath, said flap valve being attached to said partition and adapted to allow the air only to flow from said bellows body to said container through said first opening during operation of said bellows body, second valve means being arranged in said valve case to close said second opening during operation of said bellows body, and a means for operating said second valve means.

7. The pumping device claimed in claim 6, said second valve means comprising a stem having a head slidably mounted on said valve case and extending upwardly through the case, a seal packing mounted on a lower end of said stem to close and open said second opening, a valve return spring arranged between said case and the head of said stem to force said stem upwardly, said means for operating said second valve means comprising a push knob mounted on an upper end of said stem.

8. The pumping device claimed in claim 5, wherein said passage is formed by a cylindrical member mounted on the central portion of said lower plate, said cylindrical member being provided with a steam pipe and having an opening communicated with said container, and wherein said stop valve assembly is arranged in said exhaust port of said lower plate and in said cylindrical member,
   said stop valve assembly comprising a valve cylinder having a side port and an air port to form said main path, said valve cylinder being slidably arranged in said exhaust port of said lower plate and just above said opening of the cylindrical member to form a bypath between its lower end and the bottom of said cylindrical member, a seal packing mounted on the lower part of said valve cylinder, a valve member mounted on said valve cylinder to allow the air only to flow from the bellows body to the said container through said air port, a valve return spring arranged between said valve cylinder and upper plate of the bellows body to force the stop valve assembly downwardly so that said seal packing closes said bypath just after starting the contraction of said bellows body, and hooks provided at the top of said valve cylinder to pull up the same by a guide member so that said seal packing opens said bypath just before finishing the expansion of said bellows body.

* * * * *